No. 736,944. PATENTED AUG. 25, 1903.
R. DIESEL & H. GÜLDNER.
INTERNAL COMBUSTION ENGINE.
APPLICATION FILED NOV. 1, 1899.
NO MODEL. 4 SHEETS—SHEET 1.

WITNESSES:
INVENTORS:
Rudolf Diesel.
Hugo Güldner.
BY
ATTORNEY.

No. 736,944. PATENTED AUG. 25, 1903.
R. DIESEL & H. GÜLDNER.
INTERNAL COMBUSTION ENGINE.
APPLICATION FILED NOV. 1, 1899.
NO MODEL. 4 SHEETS—SHEET 2.

WITNESSES:
Geo. W. Eisenbraun
R. B. Blomeke

INVENTORS:
Rudolf Diesel,
Hugo Güldner,
BY
A. Faber du Faur
ATTORNEY.

No. 736,944. PATENTED AUG. 25, 1903.
R. DIESEL & H. GÜLDNER.
INTERNAL COMBUSTION ENGINE.
APPLICATION FILED NOV. 1, 1899.

NO MODEL. 4 SHEETS—SHEET 3.

WITNESSES:
Geo W Eisenbraun
R. B. Blomeke

INVENTORS:
Rudolf Diesel
Hugo Güldner
BY
A. Faber du Faur
ATTORNEY.

No. 736,944. PATENTED AUG. 25, 1903.
R. DIESEL & H. GÜLDNER.
INTERNAL COMBUSTION ENGINE.
APPLICATION FILED NOV. 1, 1899.
NO MODEL. 4 SHEETS—SHEET 4.

No. 736,944. Patented August 25, 1903.

UNITED STATES PATENT OFFICE.

RUDOLF DIESEL, OF MUNICH, AND HUGO GÜLDNER, OF AUGSBURG, GERMANY.

INTERNAL-COMBUSTION ENGINE.

SPECIFICATION forming part of Letters Patent No. 736,944, dated August 25, 1903.

Application filed November 1, 1899. Serial No. 735,456. (No model.)

*To all whom it may concern:*

Be it known that we, RUDOLF DIESEL, residing at Munich, and HUGO GÜLDNER, residing at Augsburg, Bavaria, Germany, citizens of the German Empire, have invented certain new and useful Improvements in Internal-Combustion Engines, of which the following is a specification.

Our invention refers to improvements in internal-combustion engines and in particular to two-stroke engines for carrying out the process described and claimed in United States Letters Patent No. 542,846, granted to Rudolf Diesel July 16, 1896, for a method and apparatus for converting heat into energy. It is, however, also applicable to other internal-combustion engines.

The invention consists, essentially, in novel means for displacing the exhaust-gases by a volume of fresh air and in certain details of construction. Prior to our present invention it has been attempted to wash out or scavenge the exhaust-gases in two-stroke internal-combustion engines of a different character; but in such engines the volume of fresh air thus introduced has not been employed to perform the function of igniting the fuel-jet in addition to the function of expelling the products of combustion of the previous charge.

Our invention will be best understood by reference to the annexed drawings, in which—

Figure 1:
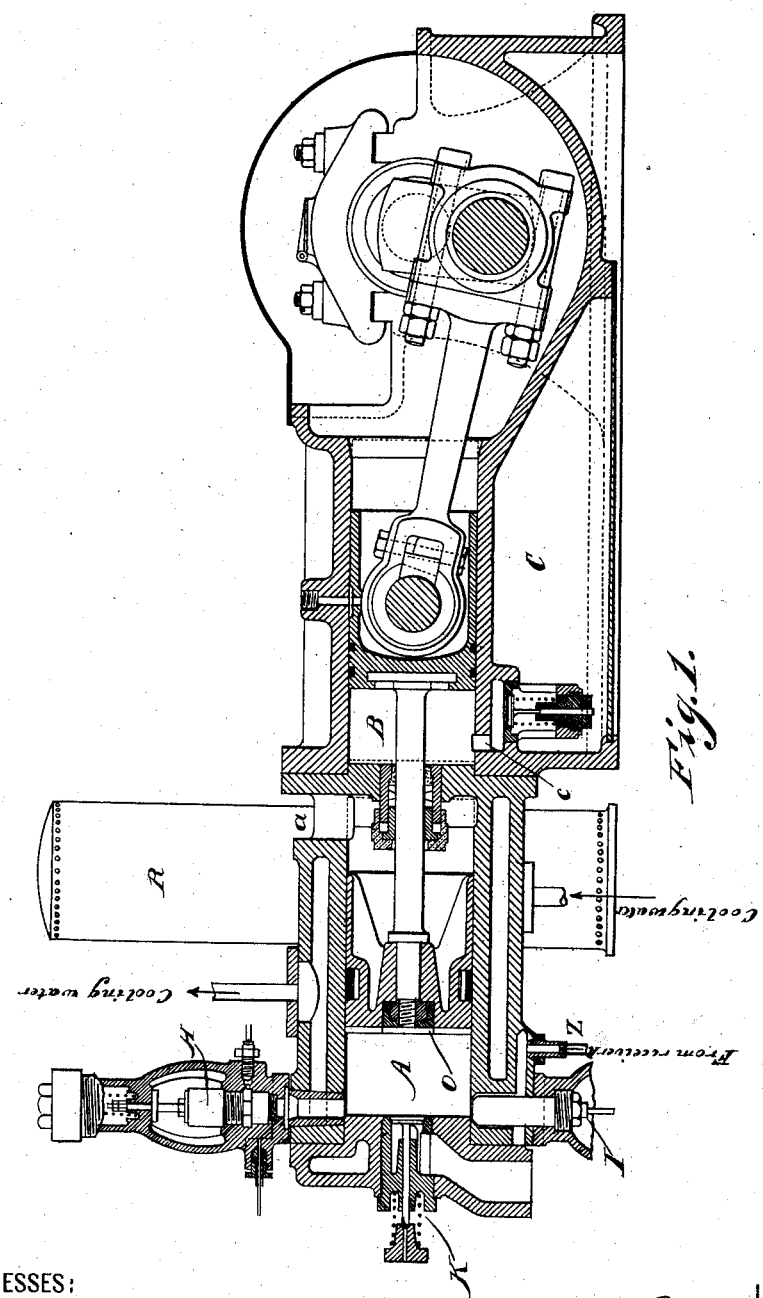
Figure 2:
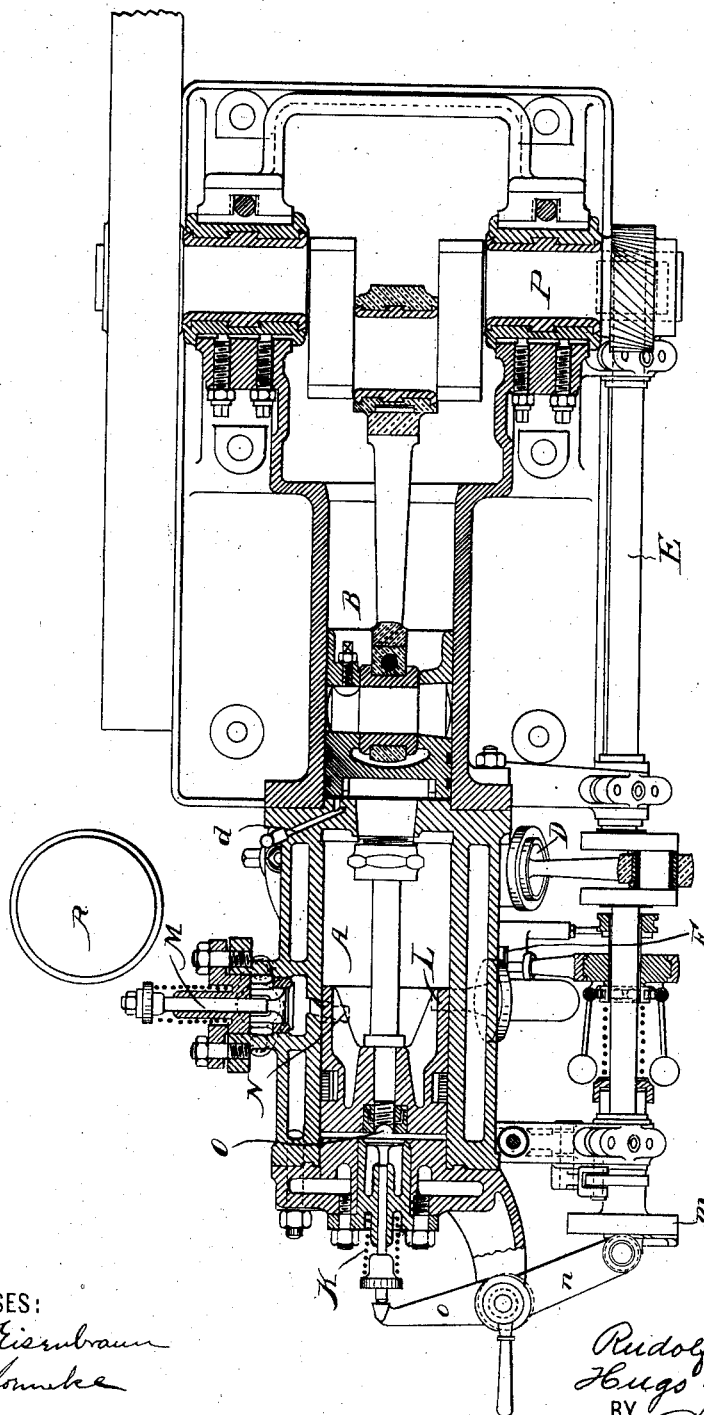
Figure 3:
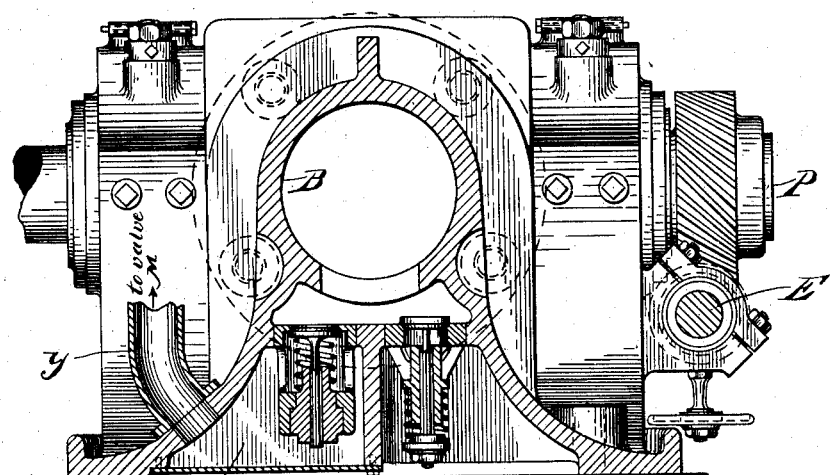
Figure 4:
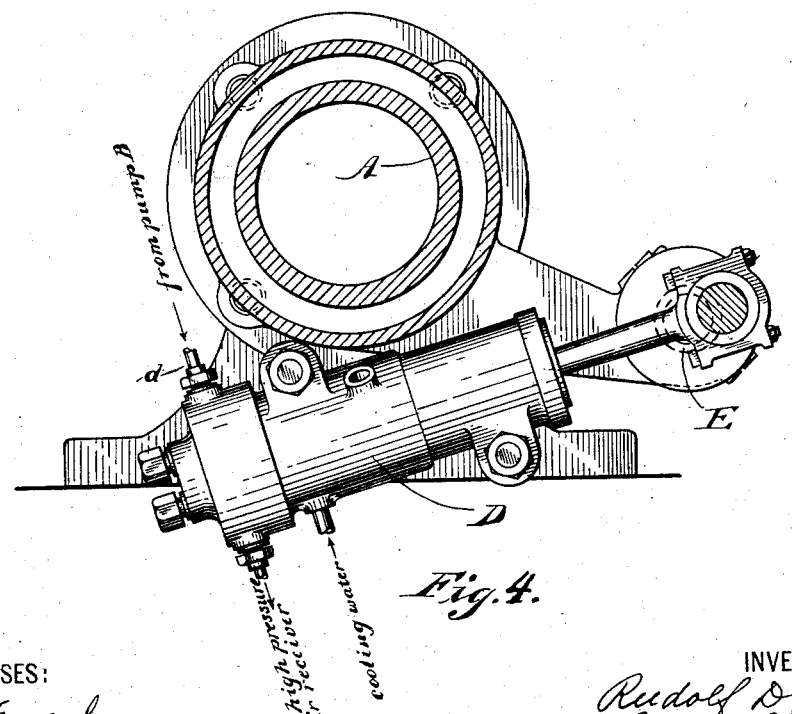

Figure 1 is a longitudinal vertical section of a two-stroke internal-combustion engine embodying our invention. Fig. 2 is a horizontal longitudinal section of Fig. 1. Fig. 3 is a vertical section of the scavenging-pump and low-pressure air-receiver. Fig. 4 is a vertical section of the working cylinder, showing the high-pressure air-compressor in elevation.

Similar letters refer to similar parts throughout the several views.

The principal parts of the machine illustrated in these drawings are a working cylinder A and piston; a low-pressure air-supply or scavenging-pump B; a low-pressure air-receiver C, into which the pump B discharges air at a pressure of about seven and one-half pounds per square inch above atmospheric pressure; an auxiliary high-pressure air-compressor D; a high-pressure air-receiver R; a petroleum-pump F; a main shaft P; a shaft E, receiving its motion from the main shaft and actuating-valves, together with operative connections.

The working cylinder A is jacketed and cooled by a current of cold water. The piston of this cylinder, as shown in Figs. 1 and 2, is about the length of the stroke, so as to cover and uncover certain ports at the proper time. The piston-rod passes through the inner end of the cylinder, which forms also the head of the scavenging-pump B, to the piston of the pump. An opening $a$, Fig. 1, through the jacket and cylinder admits atmospheric air into the space back of the piston of the working cylinder during the compressing stroke and allows it to pass out during the working stroke, the air assisting in cooling the inner surface of the cylinder and the head of the pump B. The working cylinder A is provided with a starting-valve I, a valve inlet-port H for fuel and compressed air, an exhaust-valve K, a pressure relief or equalizing channel L, an air-induction port N, with automatic check-valve M. The starting-valve I is connected to a port at the outer or left-hand end of the working cylinder and receives highly-compressed air through a pipe $z$, connected to the receiver R or other suitable source, and is actuated from the shaft E by suitable intermediate mechanism.

The valved inlet H for fuel and compressed air from a high-pressure receiver is likewise located at the outer (left-hand) end of the working cylinder and actuated by the shaft E by suitable mechanism. (Not shown.)

The spring exhaust-valve K is located in the cylinder-head and actuated from the shaft E through a cam-disk $m$ and lever $n$ $o$, Fig. 2.

The pressure relief or equalizing channel L is located near the inner (right-hand) end of the stroke, so as to be uncovered or laid open by the outer end of the piston passing it toward the end of the working stroke, allowing the gases to escape into the outer air.

The air-induction port N is located so as to commence to be uncovered by the piston at three-quarters of the working stroke and to be fully closed by the piston at about one-quarter of the return stroke, the admission of air being controlled by the automatic spring-valve M, communicating with the receiver C, connected to the scavenging-pump B.

On the head of the piston of the working cylinder A a semicircular channel or chamber O is cut out, which when the piston is at or near the end of the return stroke is in line with the nozzle of the fuel-valve H, so that when the fuel is admitted it is blown into this channel and there mixes with the highly-compressed air and ignites.

The low-pressure air-supply or scavenger-pump B is by preference arranged as shown in Figs. 1 and 2—that is, in line with the working cylinder, the pistons of the working cylinder and of the scavenger-pump cylinder having a common piston-rod and the scavenger-pump piston forming the cross-head of the engine.

The pump-cylinder is of a diameter the same as or greater than that of the working cylinder, so as to take in and discharge a volume of air equal to or in excess of the stroke volume of the working piston.

The scavenger-pump is provided with the usual suction and discharge valves, the discharge-valve projecting into the air-reservoir C. The air-outlet port $c$ of the scavenger-pump is located at a short distance from the head of the scavenger-cylinder, so as to be closed by the piston at about ninety-three per cent. of the compressing stroke, the air then remaining in the cylinder being further compressed during the remainder of the stroke and discharged through a port in the compressor-head and a connecting-pipe $d$ to the high-pressure air-compressor D.

Our invention is not restricted to the arrangement of the scavenger-pump shown and described, since compressed air may be supplied in other suitable ways. For instance, one engine may operate an air-compressor for supplying a number of engines.

The low-pressure receiver C, as shown in the drawings, is contained within the frame of the engine. It is connected to valve M by a pipe $y$. (Shown broken off in Fig. 3.) The high-pressure pump D, as shown in Figs. 2 and 4, is placed across beneath the working cylinder and actuated from the shaft E. It is so connected that it has its suction period while the charging or scavenging pump compresses. During the suction-stroke in the charging or scavenging pump B the air in the high-pressure pump is compressed to from forty-five to fifty atmospheres and under this pressure is delivered to the high-pressure receiver R.

The operation of the engine is as follows: During the working stroke of the piston of the cylinder A the low-pressure or scavenging pump B draws in air and during the greater part of the return stroke forces the air under a pressure of about seven and one-half pounds into the receiver C. At a given point of the stroke near its end the port $c$ is closed by suitable means, as by the piston covering the port, so that the air remaining in the pump is no longer discharged into the receiver C, but is further compressed and forced through the connecting-pipe $d$ into the high-pressure air-compressor D, in which the air is received at a final pressure of about two atmospheres, is further compressed to from forty-five to fifty atmospheres, and thus enters the high-pressure receiver R. Toward the end of the working stroke the piston of the cylinder A uncovers the pressure-equalizing channel L, and as soon as the pressure of the products of combustion or spent gases has been sufficiently reduced the spring-valve M opens automatically, admitting a jet of air from the receiver into the cylinder, blowing the spent gases past the piston-head out through the port L, while before the port L is again covered the exhaust-valve K is opened, so that the spent gases are forced out through it, the cylinder completely filled with fresh air, and the exhaust-valve again closed. The compression of air begins in the working cylinder at about twenty-five per cent. of the return stroke, more or less. The volume of fresh air supplied for scavenging and filling is considerably in excess of the volume between the cylinder-head and piston at the commencement of compression. Shortly before or at the end of the compressing stroke and during a small part of the working stroke the fuel-valve is open, the fuel igniting, owing to the high temperature due to compression, and heat is transformed into energy during the greater part of of the working stroke.

What we claim as new is—

1. In a two-stroke internal-combustion engine, the combination with the working cylinder and its piston, ports and valves, including an exhaust-valve, of a scavenger-pump separate from the working cylinder and of a capacity equal to or in excess of the stroke volume of the working cylinder, a cooling-space between the pump and the cylinder, a port in the cylinder near the end of the working stroke for admitting the air supplied by said pump to the working cylinder during the last part of the working stroke and the first part of the return stroke, whereby a thorough cleansing is effected and fresh air supplied, and means for closing the exhaust-valve during the early part of the return stroke, substantially as and for the purpose specified.

2. In a two-stroke internal-combustion engine, the combination with the working cylinder and its piston contained within it, ports, and valves, including an exhaust-valve, of a low-pressure air-supply and scavenger-cylinder separate from but in line with the working cylinder, and of the same diameter as the latter or larger; a cooling-space between the working piston and the scavenger-cylinder, a piston for the air-supply within the scavenger-cylinder, forming the engine cross-head; a low-pressure air-receiver into which the scavenger-pump discharges, a port in the working cylinder near the end of the working stroke provided with a valve, a connecting-passage from the low-pressure air-receiver to the valve, whereby a thorough scavenging of the working cylinder is effected and fresh air supplied, and means for closing the exhaust-valve during the early part of the return stroke, substantially as and for the purpose specified.

3. In a two-stroke internal-combustion engine, the combination with the working cylinder and its piston, ports, and valves, of a low-pressure air-supply and scavenging-cylinder and piston, the stroke volume of which is equal to or larger than the stroke volume of the working cylinder; a low-pressure air-receiver; an air-discharge port near the end of the low-pressure cylinder, through which the compressed air passes to the discharge-valve and thence to the receiver, and which port is closed by the piston during the completion of the stroke to permit further compression of the remaining air; an auxiliary high-pressure air-compressor, the suction of which is connected to the end of the low-pressure cylinder and the discharge end to a high-pressure receiver, and a fuel-feed valve on the working cylinder connected with the high-pressure air-receiver, substantially as and for the purpose specified.

4. In a two-stroke internal-combustion engine, the combination with the working cylinder and its piston, of a scavenger-pump of a capacity equal to or in excess of the stroke volume of the working cylinder, a port in the working cylinder for admitting compressed air to displace the spent gases and supply fresh air, other ports whereby the displaced gases may escape, means for closing all the cylinder-ports during the early part of the return stroke, whereby the inclosed air is compressed on the return stroke to a high temperature, a valve controlling the admission of fuel, and means for operating it, whereby a jet of fuel is injected into and ignited by the hot, compressed air in the cylinder, substantially as and for the purpose set forth.

5. In a two-stroke internal-combustion engine, the combination with the working cylinder and its piston, ports and valves, of a low-pressure air-supply and scavenger-cylinder, in line with the working cylinder, and of the same diameter as the latter or larger; a piston for the air-supply and scavenger-cylinder, forming the engine cross-head; an air-space between the head of the low-pressure cylinder and the piston of the working cylinder, having communication with the atmosphere; a low-pressure air-receiver into which the scavenger-pump discharges; a port in the working cylinder provided with a valve, a connecting-passage from the low-pressure air-receiver to the valve, whereby a thorough scavenging of the working cylinder is effected, fresh air supplied, and the working piston cooled, substantially as described.

6. In a two-stroke internal-combustion engine, the combination with the working cylinder and its piston, ports, and valves, of a low-pressure air-supply and scavenging-cylinder and piston, the stroke volume of which is equal to or larger than the stroke volume of the working cylinder; an air-space between the head of the low-pressure cylinder and the piston of the working cylinder, having communication with the atmosphere; a low-pressure air-receiver; an air-discharge port near the end of the low-pressure cylinder, through which the compressed air passes to the discharge-valve and thence to the receiver, and which port is closed by the piston during the completion of the stroke to permit further compression of the remaining air; a high-pressure air-receiver connected to the end of the low-pressure cylinder; and a fuel-feed valve on the working cylinder connected with the high-pressure air-receiver, substantially as described.

In testimony whereof we have hereunto set our hands in the presence of two subscribing witnesses.

RUDOLF DIESEL.
HUGO GÜLDNER.

Witnesses:
EMIL JESIOUCK,
F. OBERNDORF.